UNITED STATES PATENT OFFICE.

JAMES T. McKIM, OF THORNTOWN, INDIANA, ASSIGNOR OF ONE-HALF TO LEWIS MILLER, OF THORNTOWN, INDIANA.

CEMENT.

SPECIFICATION forming part of Letters Patent No. 704,849, dated July 15, 1902.

Application filed January 22, 1902. Serial No. 90,833. (No specimens.)

*To all whom it may concern:*

Be it known that I, JAMES T. McKIM, a citizen of the United States, residing at Thorntown, in the county of Boone and State of Indiana, have invented a new and useful Cement, of which the following is a specification.

My invention relates to an improvement in a hydraulic cement.

The object of my invention is to produce a hydraulic cement which shall be fine in texture, solid, strong, and totally impervious to moisture.

In the production of my cement I take approximately forty-nine parts of calcareous ocher, (preferably such as is found in the vicinity of Amestown, Alabama,) approximately forty-nine parts of commercial iron-ore paint, and approximately two parts of litharge, all by dry measure, and mix thoroughly by passing through a mill which will grind the mass to a fine powder. This mass is then submitted to a temperature of 160° Fahrenheit, being stirred frequently. After the mass has been heated it is placed in a cool dry place for about forty-eight hours. I term the compound thus formed "calcareous compound," and of this take approximately ten parts, of clean sharp sand approximately seventy parts, and of commercial Portland cement (or its equivalent) approximately seventy parts, mixing and adding to the whole sufficient water to work. The calcareous compound may be increased or diminished about ten per cent. to suit variations of temperature and soil.

The cement described has been especially produced for the construction of a seamless cement burial vault for single interments, such as described in the application of Lewis Miller, but is used for any other purpose.

I claim as my invention—

1. A cement composed of Portland cement, sand, calcareous ocher, iron-ore paint and litharge.

2. A compound to be added to Portland or similar cement, consisting of calcareous ocher, iron-ore paint and litharge.

3. A compound to be added to Portland or similar cement, consisting of calcareous ocher, iron-ore paint and litharge in the proportions specified.

4. A compound to be added to Portland or similar cement, consisting of calcareous ocher, iron-ore paint and litharge thoroughly ground, subjected to a temperature of 160° Fahrenheit and then cooled.

5. A cement composed of approximately ten parts of a calcareous compound consisting of approximately forty-nine parts calcareous ocher, forty-nine parts iron-ore paint, and two parts litharge; approximately seventy parts of Portland or similar cement; and approximately seventy parts of clean sharp sand.

6. A cement composed of approximately ten parts of a calcareous compound consisting of approximately forty-nine parts calcareous ocher, forty-nine parts iron-ore paint, and two parts litharge, ground, subjected to 160° Fahrenheit and cooled; approximately seventy parts of Portland or similar cement; and approximately seventy parts of clean sharp sand.

JAMES T. McKIM.

Witnesses:
CHAS. W. McLAUGHLIN,
JOHN E. LA RUE.